(12) United States Patent
Hubbell, Jr.

(10) Patent No.: US 8,696,243 B2
(45) Date of Patent: Apr. 15, 2014

(54) OIL CONTAINMENT BARRIER BOOM FOR SHORELINES/MARSHES/WETLAND

(76) Inventor: Paul Joseph Hubbell, Jr., Metairie, LA (US)

( * ) Notice: Subject to any disclaimer, the term of this patent is extended or adjusted under 35 U.S.C. 154(b) by 60 days.

(21) Appl. No.: 13/068,983

(22) Filed: May 25, 2011

(65) Prior Publication Data

US 2011/0293373 A1   Dec. 1, 2011

(51) Int. Cl.
*E02B 15/06* (2006.01)

(52) U.S. Cl.
USPC ............ 405/63; 405/60; 210/242.4; 210/922; 210/924

(58) Field of Classification Search
USPC .......... 405/60, 63, 70; 210/242.1, 242.4, 922, 210/924
See application file for complete search history.

(56) References Cited

U.S. PATENT DOCUMENTS

| 5,271,691 A * | 12/1993 | Willett et al. ............... 210/242.4 |
| 6,319,405 B1 * | 11/2001 | Roy et al. ...................... 210/602 |
| 2002/0008071 A1 * | 1/2002 | Chinn ........................... 210/767 |
| 2002/0131827 A1 * | 9/2002 | Spangler et al. ........... 405/302.6 |
| 2006/0000767 A1 * | 1/2006 | Trauger et al. ................ 210/503 |

* cited by examiner

*Primary Examiner* — Benjamin Fiorello (57) ABSTRACT

An apparatus for minimizing the harm done by pollution to marshlands and beaches due to hydrocarbon discharges in nearby waters is disclosed. A barrier boom apparatus is assembled by connecting together multiple individual modules, each consisting of at least one bale of Bermuda straw that is wrapped in burlap material with one end open and with excess burlap material extending away from the straw bale. The closed end of a second module is inserted into the open end of the first module's burlap bag and the modules are then held together by straps. The subsequent extended boom can be assembled without gaps between the straw bales while shaping it to conform to the contours of the land areas to be protected, and then secured on location by attachment to fence posts. The Bermuda straw bales contain oil eating microbes to detoxify the hydrocarbon pollutants.

1 Claim, 10 Drawing Sheets

FIG. 3
TWO MODULES CONNECTED

OIL CONTAINMENT BARRIER BOOM FOR SHORELINES/MARSHES/WETLAND

FIELD OF INVENTION

The invention relates to a method for minimizing the harm done to coastal areas due to hydrocarbon spills and discharges in oceans, bays, and other waters by preventing harmful pollutants from reaching ecologically and economically sensitive marshlands and beaches.

BACKGROUND OF INVENTION

Massive oil spills such as the Exxon Valdez incident in Prudohe Bay, Ak. and the Deepwater Horizon incident near the central Gulf of Mexico coast are well known environmental disasters. These and other similar events cause long-lasting damage to coastal wetlands and beaches by fouling wildlife and destroying their habitat. The intrusion of pollutants carried by tides and currents into the shallow marshes kills vital vegetation needed to withstand erosion and loss of wetlands. Further, the fouling of beaches severely impacts property values, is expensive to remediate, and causes serious economic harm to beach communities.

When a spill or discharge occurs in or near a body of water, containment booms are often deployed in an attempt to prevent the pollutants from reaching sensitive areas. In addition, absorbent booms are sometimes also used in conjunction with the containment booms to remove the pollutants.

Both of these types of prior art booms have similar characteristics in that they are generally constructed of many individual segments assembled together into long strings that constitute an extended floating boom. The interconnections between segments provide for significant flexibility so that the boom elements can freely orient at various angles with respect to each other. Thus the overall shape of the deployed boom is flexible and dynamic as the individual elements are subject to winds, currents, and wave action. Generally, such booms are towed from one end of the string to a desired deployment location. Each end of the boom is then connected to a submerged boat-type anchor to fix its location. In practice, it is often difficult to properly deploy such booms, particularly when they are made up of many elements and the winds and currents are strong and opposing, and/or the seas are rough. Further, it is impractical to employ such containment booms in very shallow waters such as wetlands where navigation of powered vessels or other access is restricted.

In addition to the deployment problems, these prior art containment boom systems are unreliable in practice. Rough, choppy waters and waves allow pollutants to overtop the floating barriers and thus reach environmentally sensitive areas. In addition, such conditions, including strong winds, often cause the anchors to slip with the result that the desired protective posture of the boom is compromised. In many cases, such booms have been observed to actually wash up onto the beaches or shoreline they are intended to protect and are thus rendered useless.

Most barrier booms are constructed of a dense nylon fabric with a longitudinal pocket at the top that encloses flotation material. A length of cable is also sewn into the barrier element at the very top, above the flotation material. Below the flotation pocket the fabric forms a skirt that extends down a few feet below the water surface. At the very bottom of the skirt is a fabric channel that houses a length of chain that causes the skirt to drag below the surface. There are coupling means at each end to allow individual segments to be assembled into long boom lines. Barrier booms are inherently expensive since their manufacture requires several types of materials and multiple manufacturing steps.

Absorbent booms are much simpler in construction. Basically they consist of long "socks" of porous nylon tubing that are filled with absorbent material. Attachment elements are sewn in at both closed ends of the sock, allowing them to be strung together in long boom lines. They are designed to float on the surface of the water and thus capture pollutants there such as hydrocarbons.

Other methods of protecting wetlands and beaches from harmful pollutants involve the use of bales of natural materials such as hay or straw materials strategically located at the waterline immediately adjacent to the wetland or beach areas to be protected. Depending on the tides and waves, the bales are partially submerged while resting on the shallow sea floor. The particular benefit of these methods is that the bales are deployed so as to provide a protective barrier while simultaneously providing an absorbing medium to capture any pollutants that encroach on their location.

One of the drawbacks of the prior art methods involving the use of bales of natural materials is that they are usually deployed individually and great care must be exercised to avoid gaps between the neighboring bale elements, otherwise the deployment will fail to provide a seamless barrier. Even when successfully deployed without gaps it is harder to prevent gaps from developing after exposure to winds and wave action as the individual bales may break apart and be displaced from their initial position.

SUMMARY OF INVENTION

The object of the current invention is to provide a method of interconnecting individual bagged bales of natural materials in such a way as to provide a more effective and durable boom for containing polluting discharges in costal wetland and beach environments.

This invention discloses a method of enclosing bales within a bag to produce individual bagged bale modules that are then interconnected with other such bagged bale modules in such a way as to eliminate gaps during deployment and prevent the formation of gaps and breaches after deployment.

In a preferred embodiment, a material such as burlap is used to form a "bag" that contains a bail of compacted material such as hay or straw. The bag is sewn closed on one end and left open on the opposite end. The open end has substantial excess material so that the said excess material may overlap and partially enclose the closed end of a similar neighboring bag/bale module. The edge of the material of the open end also has retainer rings and or ties attached for fastening a first module to a second neighbor module. In addition, vertical and horizontal straps are used to fasten the modules together when assembling a boom structure.

Another object of this invention to provide a method of constructing containment booms that serve the dual purposes of containment and pollution trapping functions. A bail material is selected based on its ability to absorb the pollutants involved in the particular discharge. In the case of a hydrocarbon discharge, Bermuda grass straw bales would be selected based on their ability to absorb hydrocarbon pollutants.

DETAILED DESCRIPTION OF INVENTION

The object of the current invention is to provide a method of interconnecting individual bagged bales of natural materials in such a way as to provide a more effective and durable barrier booms for containing and absorbing polluting discharges in costal wetland and beach environments.

Figure 1:
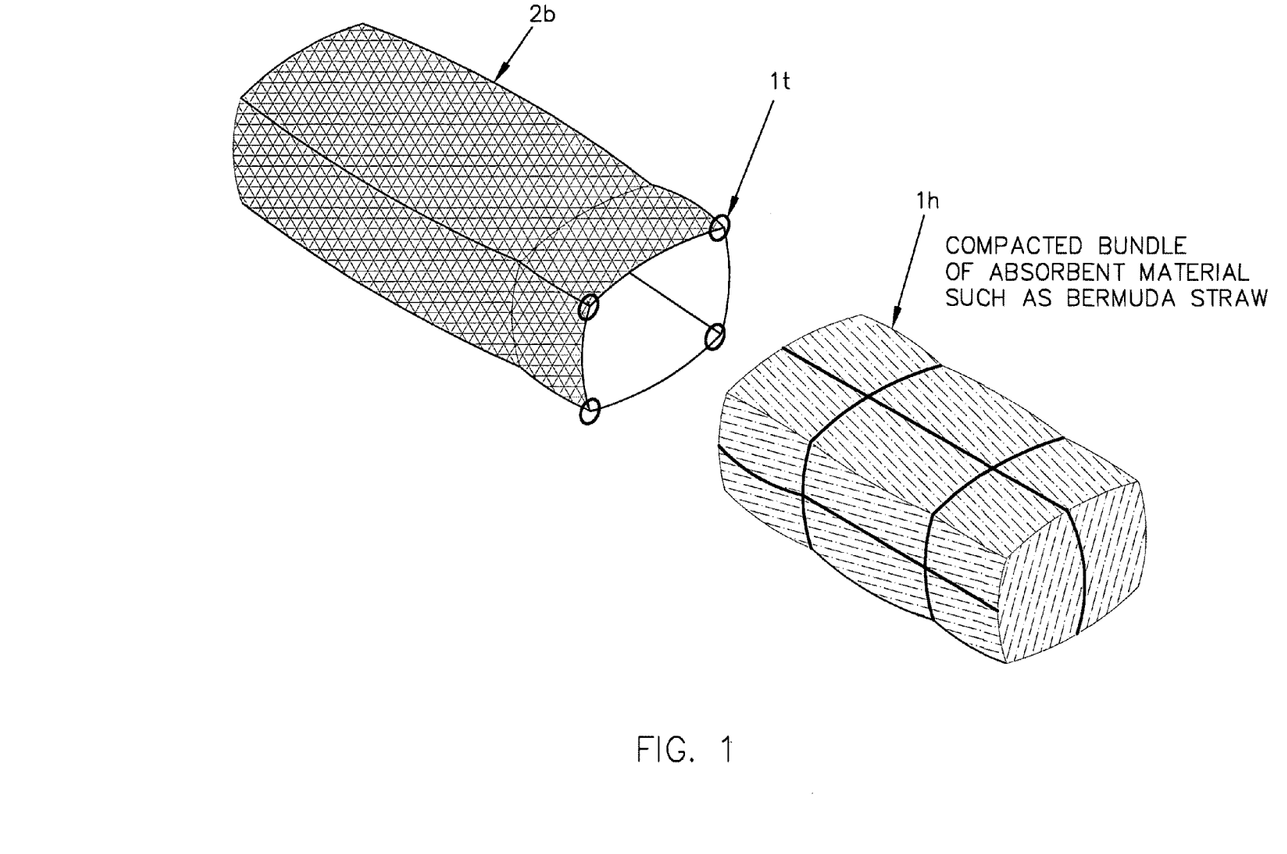
FIG. 1 is a view of a module consisting of a compacted bundle of absorbent material such as Bermuda straw prior to being enveloped by a burlap bag that is closed on one end.

FIG. 1 illustrates the basic construction of the individual modules. Element 1h denotes a compacted bundle of absorbent material such as Bermuda grass straw, or other natural biodegradable materials, capable of absorbing pollutants and filtering contaminants when immersed in waters at shorelines of coastal marshes and beaches. The nominal dimensions of such bales are 36 in. long×18 in. high×12 in. wide (the bottom surface area measures 36 in.×12 in.). The straw material within the bails may be infused with oil-eating microbes to detoxify oil and hydrocarbon pollutants. The bale's rectangular shape and structure are maintained by various straps placed around the outside.

Also shown in FIG. 1 is an enveloping bag, 2b, constructed of natural biodegradable fabric such as burlap with 10 lb. strength.

The bag 2b is secured closed along its length and at one end by sewing with twine or nylon or by other suitable fastening means. The final dimensions of the bag are selected to ensure that it fits snuggly around the compacted absorbent material 1h while the proximal end of the bag 2b remains open. The bag may be assembled directly onto the bail 1h from precut fabric, or may be pre-assembled so that the bail is inserted afterwards. The fabric at the open end of the bag extends a nominal distance of 12 in. away from the bail after assembly and may overlap with the closed, distal end of a second module abutted end-to-end with first as shown in FIG. 3.

The open end of the bag 2b of FIG. 1 has a plurality of tie-elements, 1t, that are provided to facilitate the connection of the first module to an abutted second module, or to an anchoring means. The ties 1t may be constructed from polytetrafluoroethylene (PTFE) materials.

Figure 2:
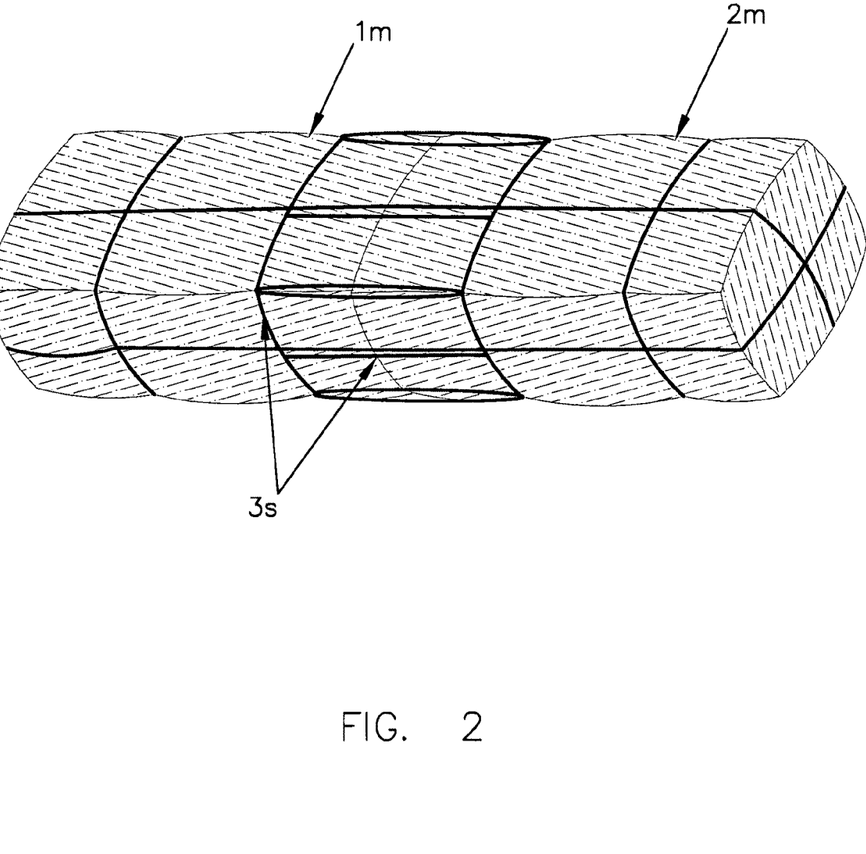
FIG. 2 illustrates two bales of compact absorbent material joined end-to-end and secured together by straps.

FIG. 2 shows a first method of joining two bale modules. The two compacted bales, 1m and 2m, joined end-to-end and secured together by straps 3s that may also be constructed from PTFE materials. In this method, the bales are joined before enveloping them with burlap fabric.

Figure 3:
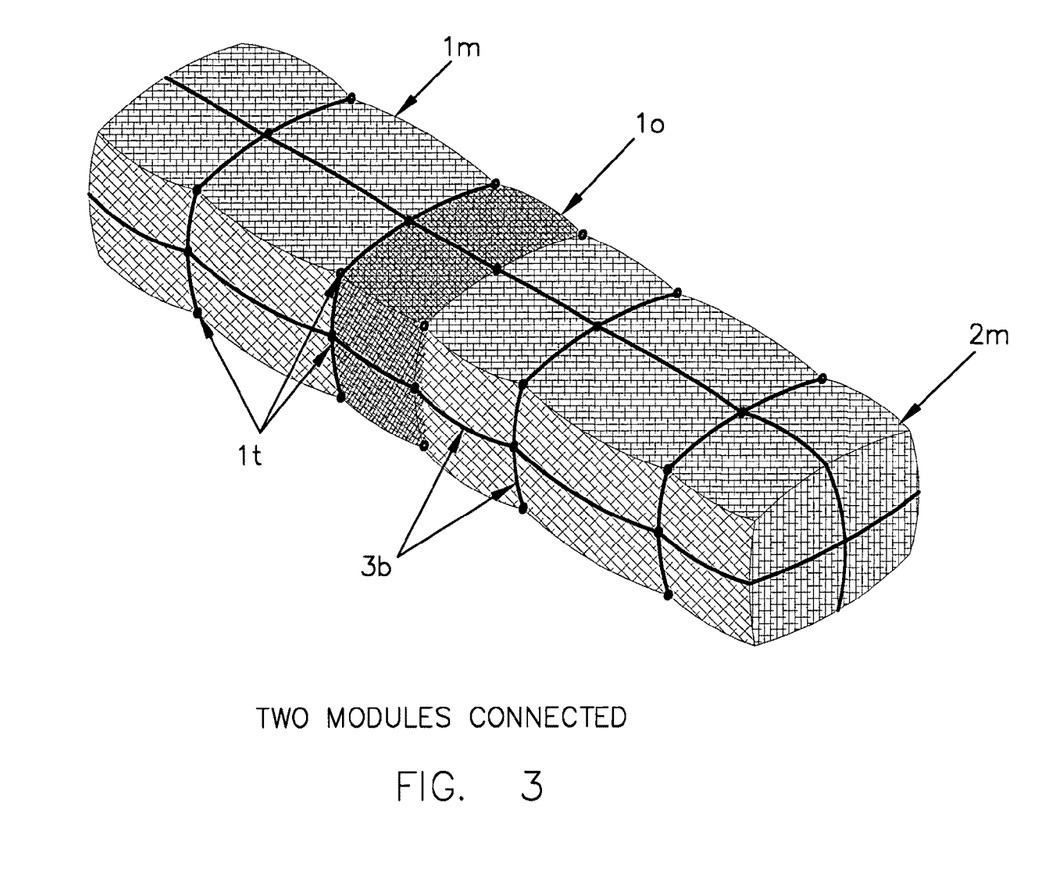
FIG. 3 depicts a two-module boom consisting of two compacted bales of absorbent material connected end-to-end that are each enveloped in a burlap bag where each bag is closed on opposite ends, but overlap each other in the vicinity where the bales are connected.

A second method of connecting two modules is illustrated in FIG. 3 where the modules are connected after first covering them with burlap material.

In FIG. 3, the distal end of module 2m is inserted into the open end, 1o, of the burlap bag enveloping the module 1m, thereby causing the open end of said bag to overlap the closed end of the adjacent bag enclosing module 2m by approximately 12 in. The ties, 1t, may be used to secure the modules together. Additional horizontal and vertical strapping elements, 3b, may also be used to help secure the two units together, where such strapping may also be constructed from PTFE materials.

Figure 4:
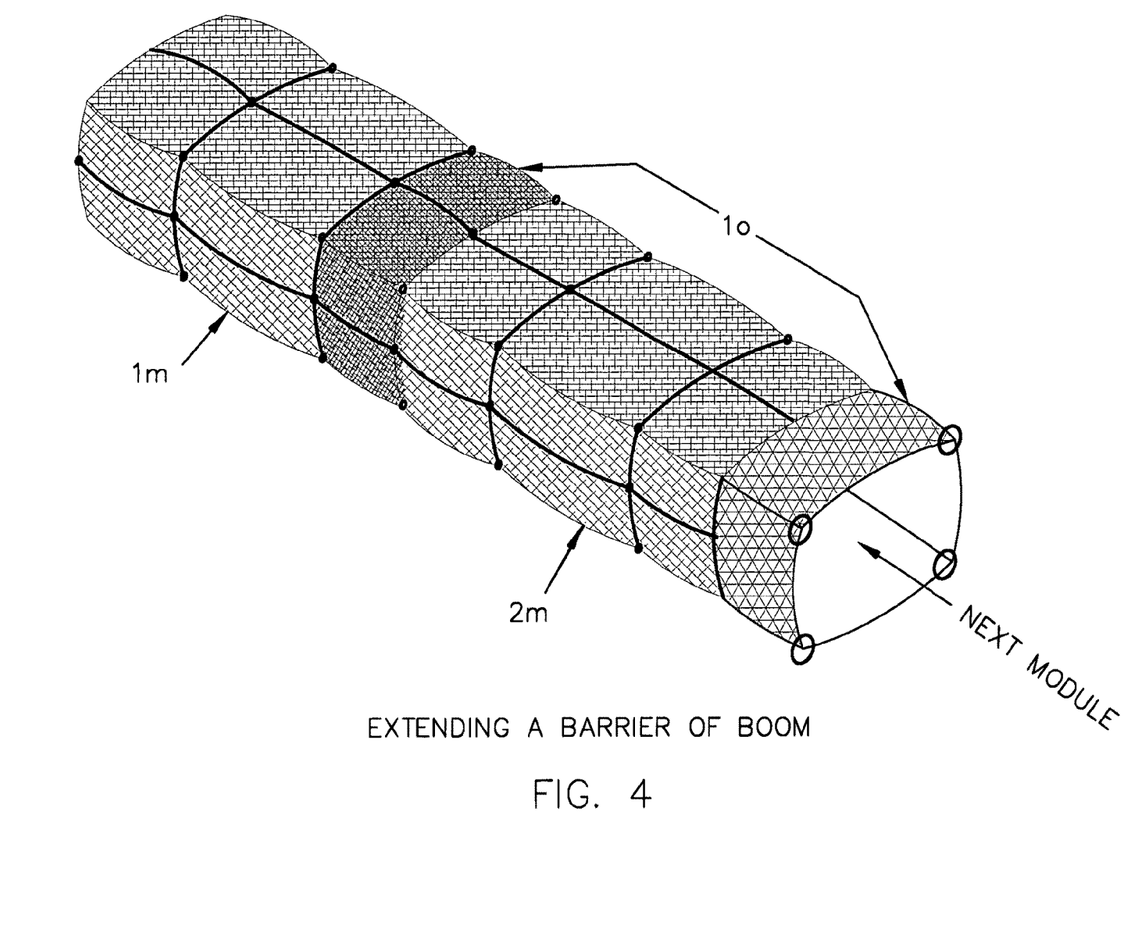
FIG. 4 shows a two-module section of boom with one end of the burlap cover bag left open to receive another module.

FIG. 4 illustrates how a barrier boom of extended length may be constructed by attaching multiple covered straw bale modules together and attaching them using the method shown in FIG. 3.

Figure 5:
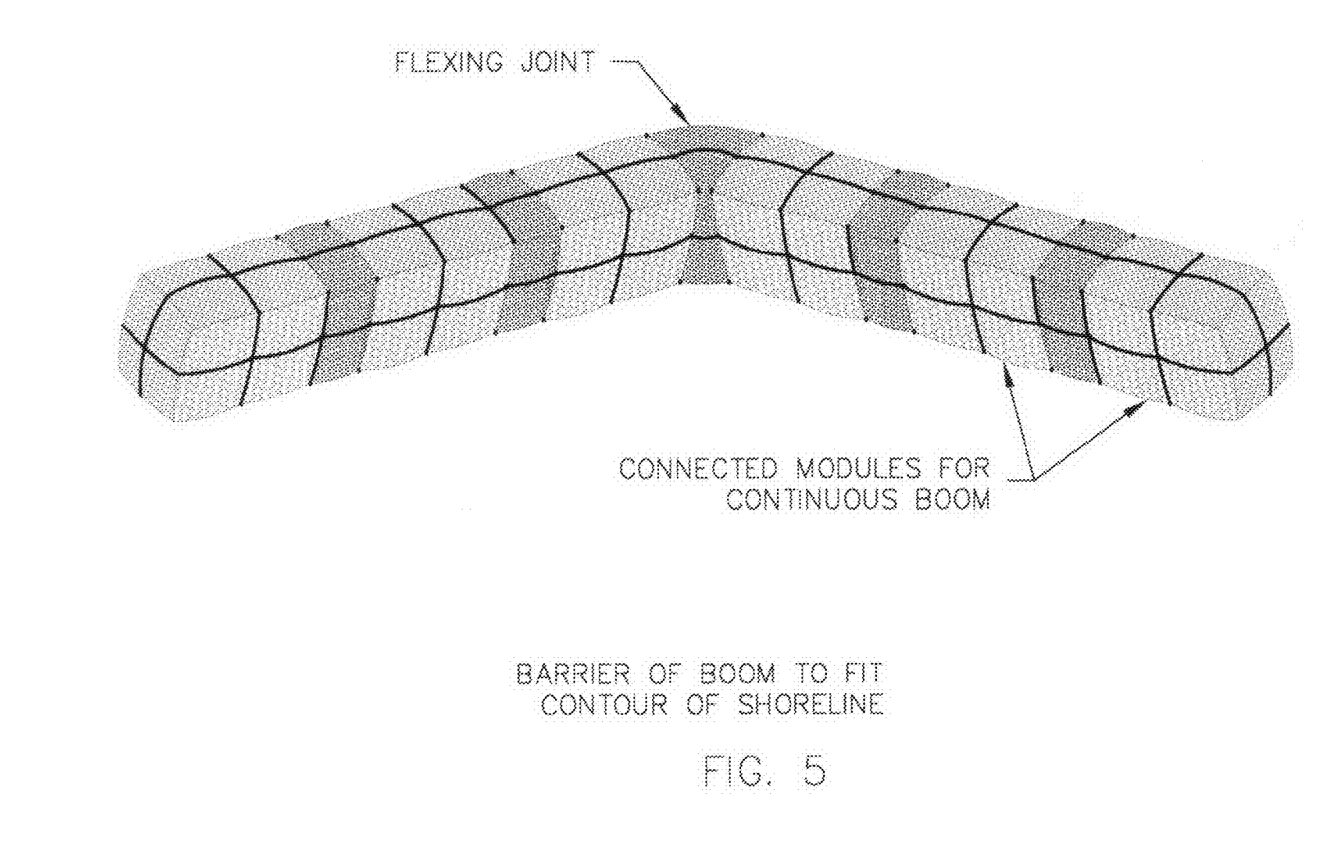
FIG. 5 is a view of a continuous barrier boom consisting of a plurality of connected burlap-encased, compacted absorbent bail modules illustrating a flexible joint that allows the boom to conform to irregular contours of shore lines.

FIG. 5 illustrates an extended barrier boom constructed of a plurality of modules using the method described in FIG. 3. One of the connections between modules is formed as a flexing joint. The use of such flexible joints allows the booms to have curved shapes in order to conform to that of irregular shorelines.

Figure 6:
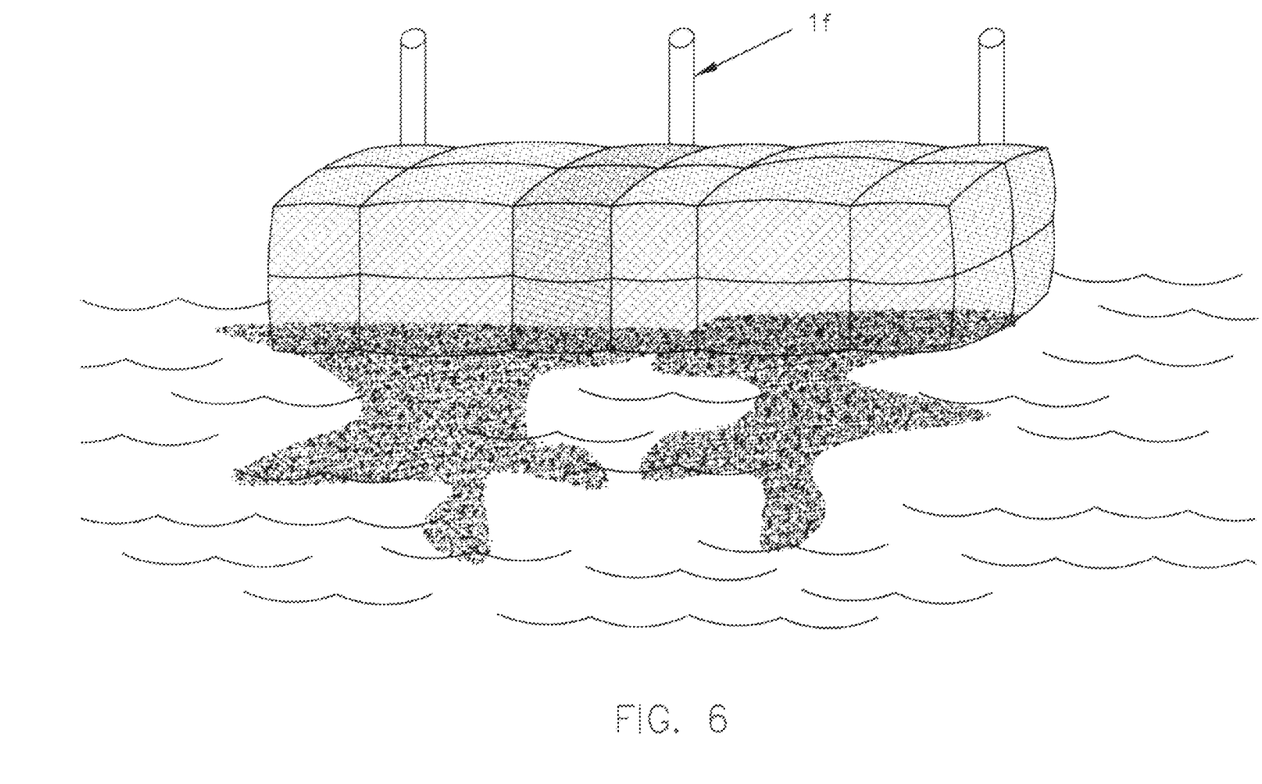
FIG. 6 depicts a two-module section of boom located along a shoreline and anchored in a fixed location by posts.

Fence post elements may be used to ensure that the deployed boom structures assembled from modules as contained herein remain in their desired location even under severe weather conditions. FIG. 6 illustrates the use of such fence posts, 1f. The fence posts may be of wood or steel construction and may be of singular pieces or multiple attached sections bolted together. Such fence posts would preferably be coated with epoxy and include slotted sections to accommodate PTFE straps or ties or nylon rope stringers used for attaching segments of the boom structure to the posts.

Figure 7:
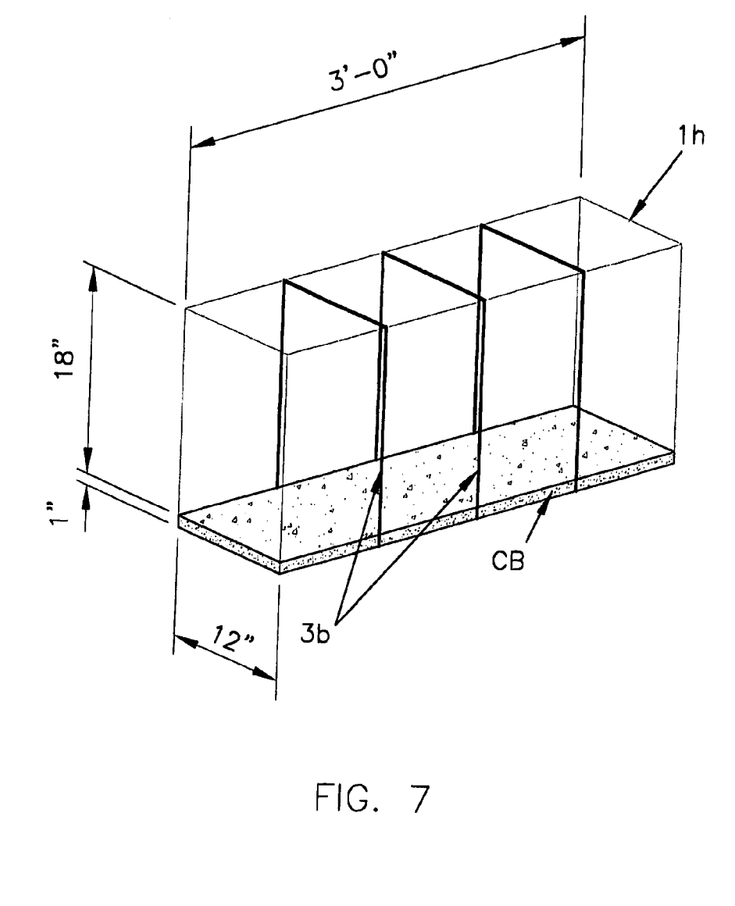
FIG. 7 illustrates a method of attaching a sheet of flotation material to the bottom of a compacted bail of absorbent material to provide buoyancy to individual boom modules.
Figure 8:
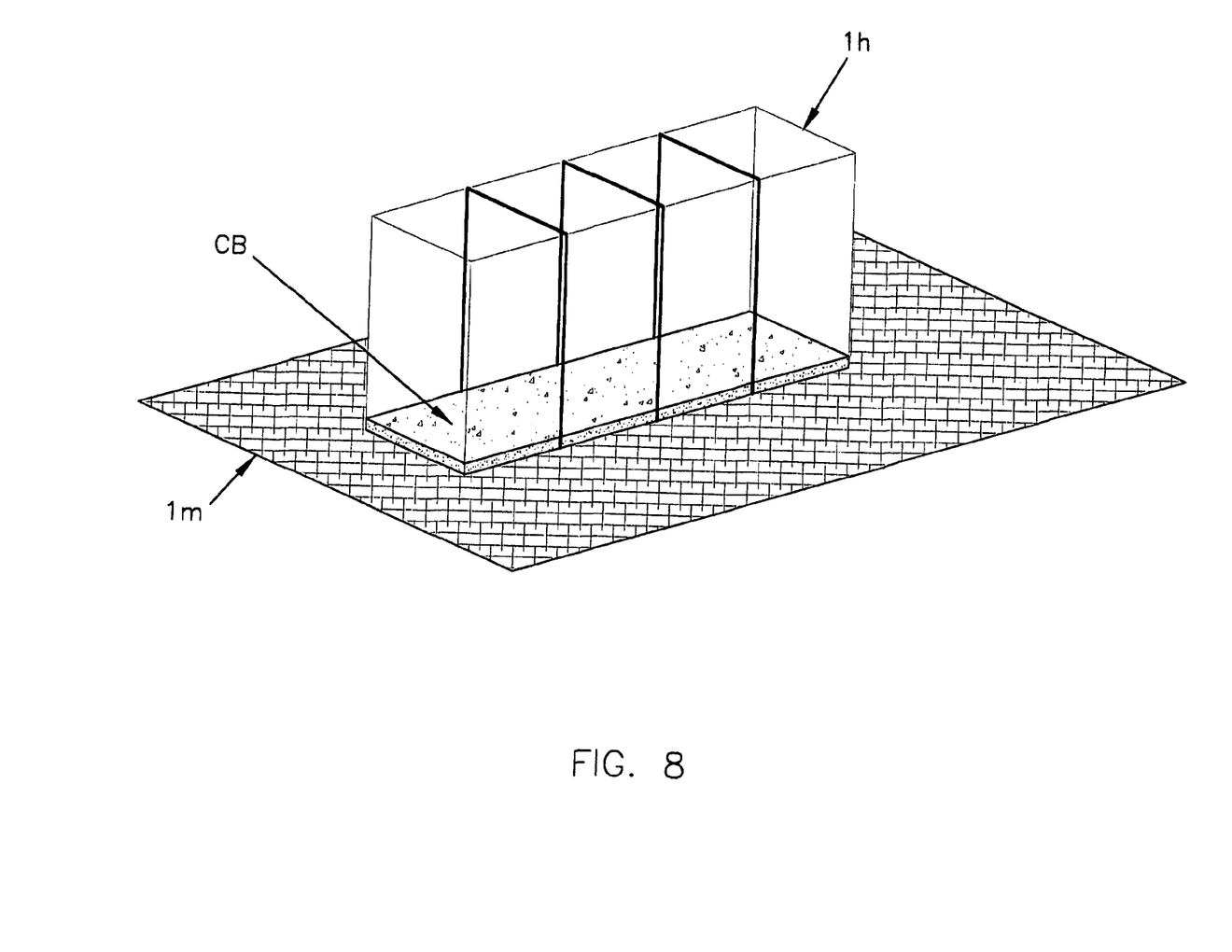
FIG. 8 shows the internal components of a boom module with flotation element attached resting on a sheet of burlap material before wrapping and sewing the burlap covering.
Figure 9:
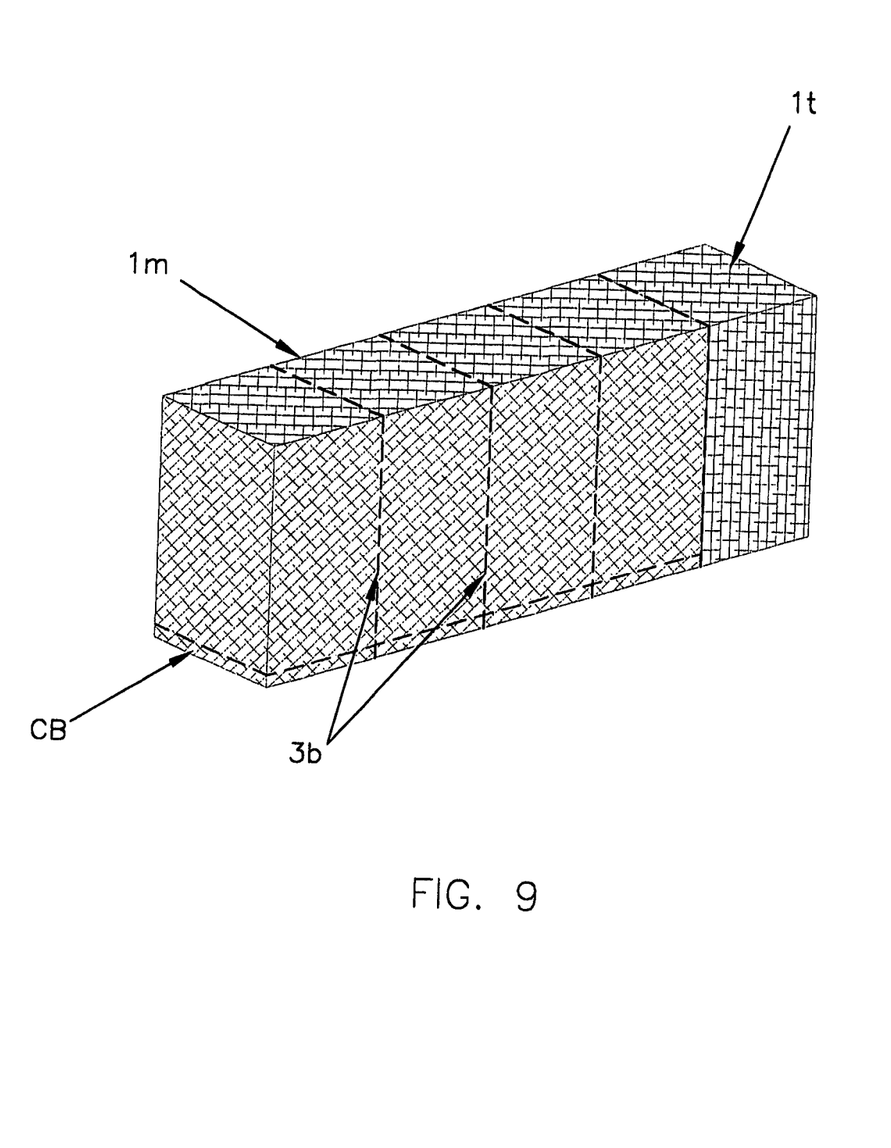
FIG. 9 depicts the boom module after wrapping and sewing the burlap covering where one end is left open to facilitate connection to another module.
Figure 10:
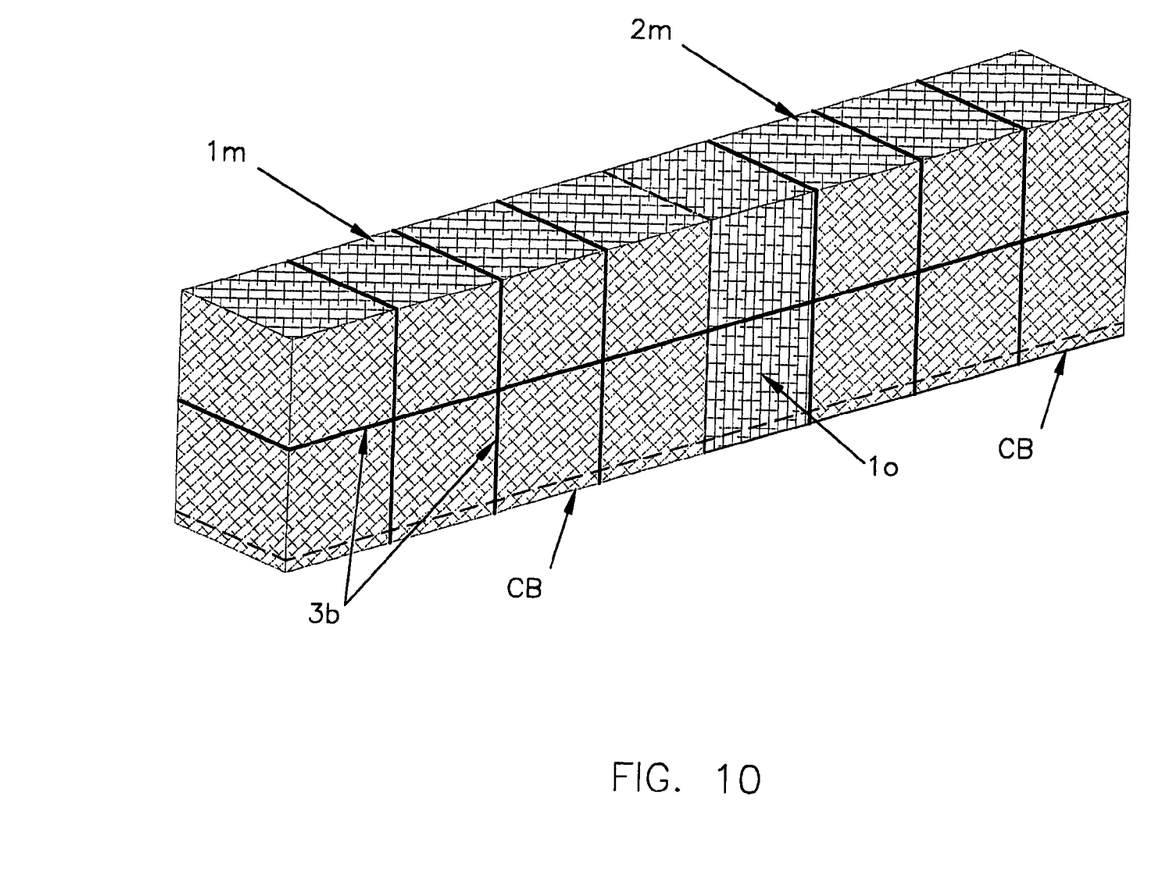
FIG. 10 illustrates a two-module section of boom incorporating flotation material.

In order to enhance the buoyance of the boom structure, the modules may include flotation materials, such as cork board, in addition to the bailed straw. FIG. 7 illustrates the attachment of a 1 in. thick sheet of cork board, CB, to the underside of a straw bale using straps, 3b. FIG. 8 shows a premeasured section of burlap material under the bale after attaching the cork board. FIG. 9 shows the completed module after the burlap material is sewn around the bail with cork board. And finally, FIG. 10 shows a two-module section of boom that includes flotation material to provide enhanced buoyance.

Numerous modification and alternative embodiments of the invention will be apparent to those skilled in the art in view of the foregoing description. Accordingly, this description is to be construed as illustrative only and is for the purpose of teaching those skilled in the art the best mode of carrying out the invention. The details may be varied substantially without departing from the spirit of the invention.

What is claimed is:

1. An apparatus employed to block, divert, absorb, filter and detoxify residual contaminants from an oil spill, said apparatus comprising:
   a first rectangular Bermuda straw bale encased within a biodegradable burlap fabric wrap,
   wherein said first Bermuda straw bale encased within said biodegradable burlap fabric wrap is closed at one end by sewing with twine or nylon while an opposite end is open with at least a 12 inch extension of burlap to accommodate a second rectangular Bermuda straw bale,
   wherein said biodegradable burlap fabric wrap has at least three polytetraflouroethylene straps on the exterior thereof to secure said biodegradable burlap fabric wrap to the first and second Bermuda straw bales, wherein said first and second Bermuda straw bales contain oil eating microbes which detoxify oil and hydrocarbons, wherein said first and second Bermuda straw bales each comprise a corkboard base attached to a bottom of the first and second Bermuda straw bales, and wherein said apparatus is secured to fence posts comprised of wood or steel.

* * * * *